L. D. LOVEKIN.
APPARATUS FOR EFFECTING A TRANSFER OF HEAT FROM ONE FLUID TO ANOTHER.
APPLICATION FILED MAR. 5, 1910.

1,113,226.

Patented Oct. 13, 1914.
6 SHEETS—SHEET 1.

L. D. LOVEKIN.
APPARATUS FOR EFFECTING A TRANSFER OF HEAT FROM ONE FLUID TO ANOTHER.
APPLICATION FILED MAR. 5, 1910.

1,113,226.

Patented Oct. 13, 1914.

WITNESSES.

INVENTOR

BY

ATTORNEY.

L. D. LOVEKIN.
APPARATUS FOR EFFECTING A TRANSFER OF HEAT FROM ONE FLUID TO ANOTHER.
APPLICATION FILED MAR. 5, 1910.

1,113,226.

Patented Oct. 13, 1914.
6 SHEETS—SHEET 3.

L. D. LOVEKIN.
APPARATUS FOR EFFECTING A TRANSFER OF HEAT FROM ONE FLUID TO ANOTHER.
APPLICATION FILED MAR. 5, 1910.

1,113,226.

Patented Oct. 13, 1914.

INVENTOR

BY

ATTORNEY.

UNITED STATES PATENT OFFICE.

LUTHER D. LOVEKIN, OF PHILADELPHIA, PENNSYLVANIA.

APPARATUS FOR EFFECTING A TRANSFER OF HEAT FROM ONE FLUID TO ANOTHER.

1,113,226. Specification of Letters Patent. Patented Oct. 13, 1914.

Application filed March 5, 1910. Serial No. 547,597.

*To all whom it may concern:*

Be it known that I, LUTHER D. LOVE-KIN, a citizen of the United States of America, residing in the city and county of Philadelphia, in the State of Pennsylvania, have invented a certain new and useful Improvement in Apparatus for Effecting a Transfer of Heat from One Fluid to Another, of which the following is a true and exact description, reference being had to the accompanying drawings, which form a part thereof.

My present invention relates to the heating and cooling of fluids.

The primary purpose of the invention is to provide a novel apparatus for effectively cooling a gaseous fluid, such as air, by the use of a cooling agent, such as dense air, which is at a temperature substantially below the freezing point of the moisture which may be contained in the fluid cooled. I have found a most effective process for the purpose specified to consist in causing the air to be cooled to flow rapidly in a relatively thin stream or streams upwardly and in causing the cooling agent to flow rapidly downwardly, in a thin film like stream or streams, along a partition wall or walls formed of good heat conducting material and serving to separate the two fluids. By causing the two fluids to flow rapidly in streams and along thin partition walls of the character specified, I effect a rapid and efficient transfer of heat from the hotter fluid to the colder one, with apparatus of small bulk, and which is relatively inexpensive to manufacture. By employing the particular directions of flow of the two fluids specified I avoid to a remarkable extent, trouble and loss of efficiency, which is experienced when the direction of flow of the two fluids is reversed and which is caused by the deposit in a solid form on the partition wall or walls of the moisture frozen out, so to speak, of the air being cooled.

My present invention consists in part in the apparatus hereinafter disclosed for carrying out the process described in the preceding paragraph.

The invention is particularly useful in cooling air through what may be called an atmospheric range of temperatures, say from 100 or 110 degrees Fahrenheit to 70 or 80 degrees Fahrenheit by the use of dense air delivered from a refrigerating machine at a temperature much below the freezing point of water, for example at a temperature of minus 80 degrees Fahrenheit and returned to the refrigerating machine at a temperature of say plus 30 degrees Fahrenheit. Of course, it will be understood that the temperatures given are only illustrative. The actual temperatures employed will vary with the conditions of use.

My invention consists also in certain features of construction and arrangement generally useful in apparatus for effecting an interchange of heat between two fluids of different temperatures regardless of whether either fluid is a liquid or a gas, and of whether the ultimate purpose of obtaining the interchange of heat is to cool the hotter fluid or to warm the colder fluid.

The various features of novelty which characterize my invention are pointed out with particularity in the claims annexed to and forming a part of this specification. For a better understanding of the invention however, and the advantages possessed by it, reference should be had to the accompanying drawings and descriptive matter in which I have illustrated and described several forms of apparatus by means of which the invention may be carried out.

Of the drawings, Fig. 9ª is an elevation, partly in section, of a portion of the apparatus generally similar to that shown in Figs. 8 and 9, but embodying a further modification. Fig. 9$^b$ is a partial section on the line 9$^b$—9$^b$ of Fig. 9$^a$.

In carrying out my invention I obtain the film like flow of one of the fluids by causing it to flow through the space formed between two tubes arranged one within the other but having the external diameter of the outer tube slightly greater than the external diameter of the inner tube. In cooling air through an atmospheric range of temperatures by the use of dense air as a cooling agent with this apparatus I prefer to pass the cooling agent down through these annular spaces of the double tube elements.

Figure 1:
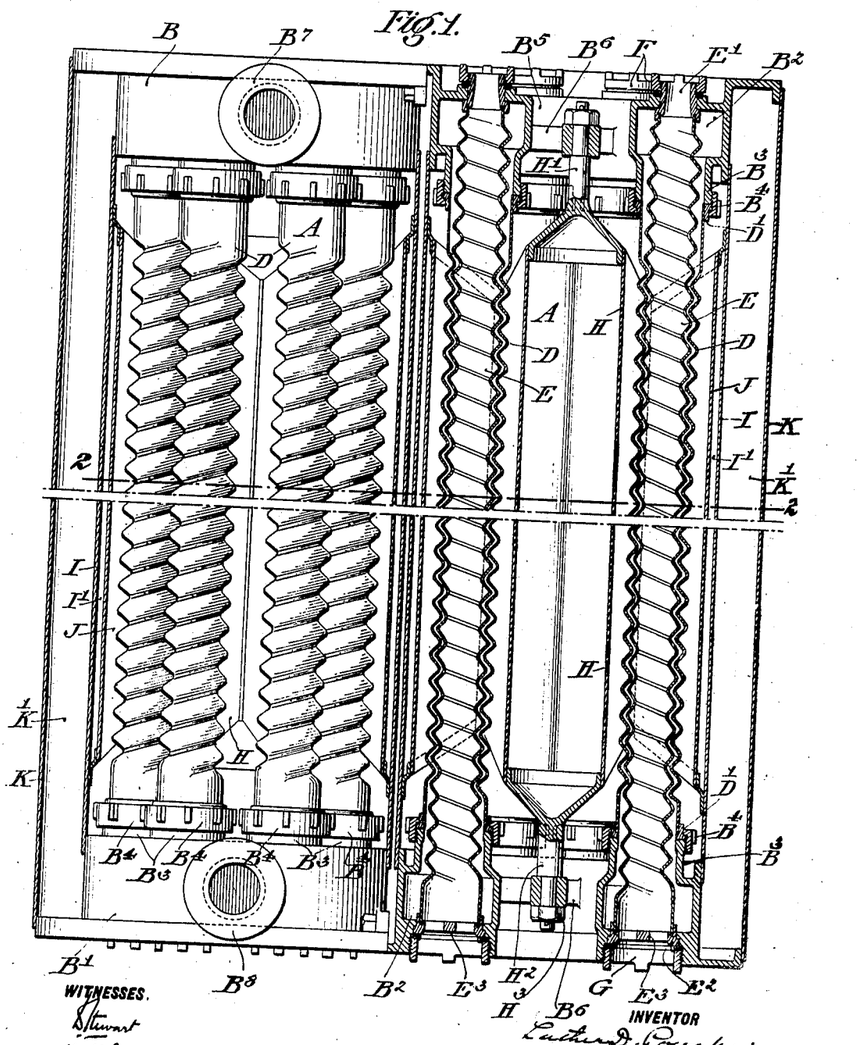
Figure 1 is an elevation, with parts broken away and in section, of a portion of one form of apparatus constructed in accordance with my present invention.
Figure 2:
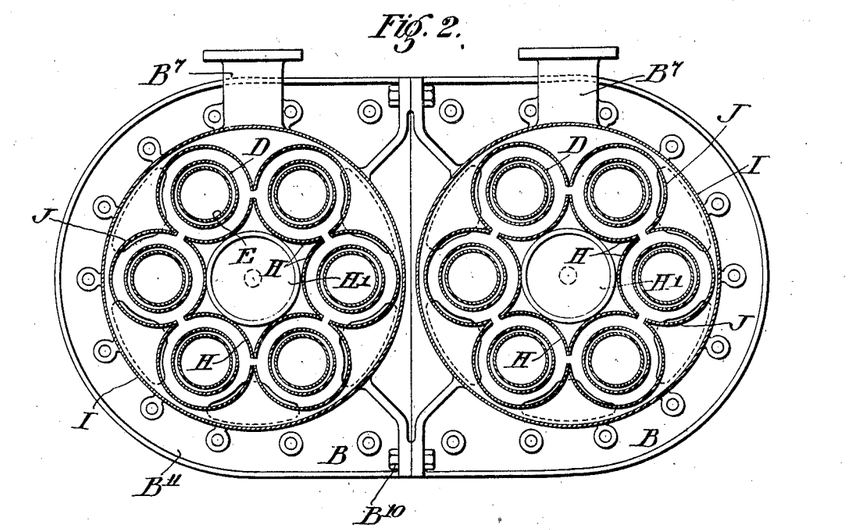
Fig. 2 is a sectional plan of the apparatus shown in Fig. 1, but with the outer casing removed, the section being taken on the line 2—2 of Fig. 1, looking upward.
Figure 3:
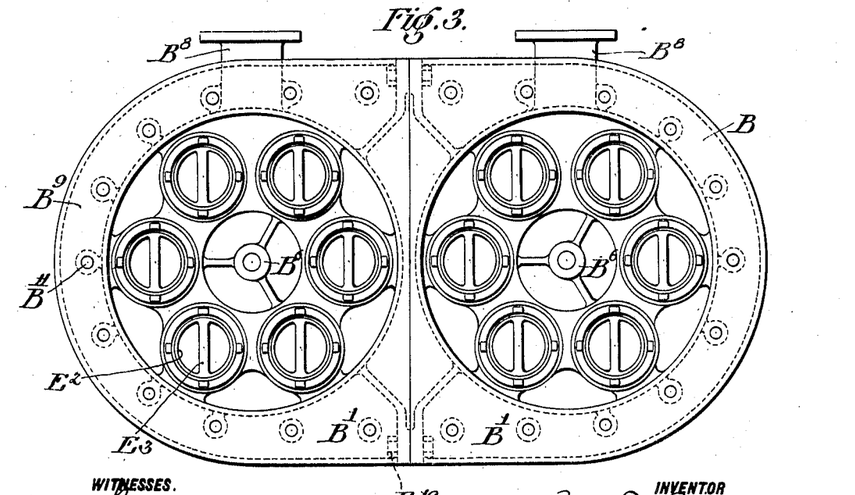
Fig. 3 is an inverted plan of the apparatus shown in Fig. 1.

A preferred arrangement of the tubes and the provisions for obtaining a film like flow of the fluid to be cooled along the outer surface of the outer tube and the inner surface of the inner tube is illustrated in Figs. 1, 2 and 3, where A represents units, each of which comprises similar annular top and bottom members B and B' which are surrounded by an external casing I and are formed on their inner ends with a circular series of axially extending hollow bosses B$^3$ open each at its inner end to an annular channel B$^2$ formed in the corresponding end member B or B' and surrounding the central passage B$^5$. The ends of the bosses B$^3$ are externally threaded and the outer tube D of each double tube element is secured between an alined pair of bosses B$^3$ of the opposed end members B and B' by means of clamping nuts B$^4$ by which the end members D' of the tube D are clamped against the ends of the bosses B$^3$. The inner tube E of the double tube elements has end members E' and E$^2$ which pass through and fill apertures in the outer end walls of the upper and lower end members B and B'. As shown, the upper end member E' of each tube E is externally threaded to receive a clamping nut which serves to clamp the end member E' in place, the end member E' being provided with a shoulder which takes against the inner surface of or shoulder on the outer end wall of the end member B. The lower end member E$^2$ of each tube E is provided with an external shoulder which takes against the corresponding bearing surface formed by or on the lower wall of the lower end member B, and an externally threaded nut G clamps each end member E$^2$ in place. By preference also the tubes D and E are spirally corrugated with the convolutions nesting together as described and claimed in my prior Patent 904,627, granted Nov. 24, 1908. By preference, as shown, also, the end member E' is made smaller than the minimum internal diameter of the tube D and smaller than the orifice in the outer end wall of the end member B' so that by removing the nuts F and G the tube E can be withdrawn. This facilitates the cleaning of the tube surfaces and the adjustment and repair of parts. No claim to this feature of construction is made herein however, as I have described and claimed such an arrangement in my prior Patent 1,005,441, granted October 10, 1911. E$^3$ represents cross bar portions of the end members E$^2$ used to facilitate the withdrawal and insertion of the inner tube E. B$^7$ and B$^8$ represent pipe connections through which the cooling fluid may be admitted to the space B$^2$ of end member B and discharged from the similar space B$^2$ of end member B' after passing through the various annular channels formed between the tubes D and E of the various double tube elements. To obtain the desired film like flow of the fluid to be cooled which enters each unit A through the central passage B$^5$ formed in end member B' and leaves through the similar central passage formed in the end member B', an internal displacement member H is provided which, as shown, comprises body portion H in the form of a hollow fluted cylinder and tapered end portions H'. The latter terminate in bolt like portions H$^2$ which extend through spiders B$^6$ forming parts of and located in the central axial passage B$^5$ of the end members B and B'. Nuts H$^3$ secure portions H$^2$ and the spiders B$^6$ together and this central displacement member H thus forms an effective frame connection for uniting the end members B and B'. A displacement member J, also in the form of a fluted cylinder, is secured at its ends to the outer casing I of each unit. Each groove in the outer surface of the internal displacement member H thus unites with the adjacent groove in the inner surface of the external displacing element J to provide a channel in which a corresponding double tube element is located. With this arrangement, as shown best in Fig. 2, the outer wall of the body portion of the tube D of each double tube element is surrounded by a space annular in cross section, and of any desired thickness, one half of the outer wall of this space being formed by a corresponding portion of the fluted member H, and the outer half of the inclosing wall being formed by a corresponding portion of the fluted cylinder J.

Figure 10:
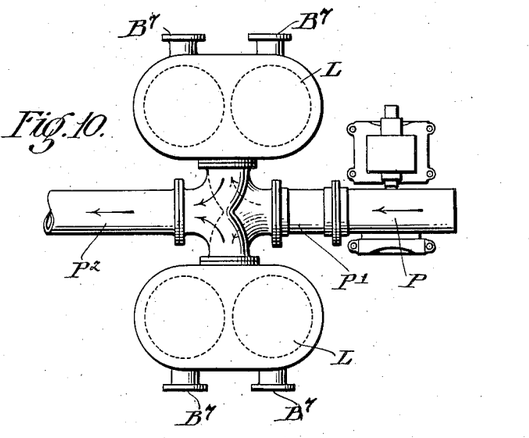
Fig. 10 is a somewhat diagrammatic representation of an arrangement embodying the apparatus of Figs. 1, 2 and 3.

The two units A shown in Figs. 1, 2, and 3 have their end members B and B' connected by bolts B$^{10}$ to form a unitary body to be secured between the hollow end members proper of the complete apparatus as indicated for instance in Fig. 10. The end members B and B' may be formed at their outer ends with flanges B$^9$ which conform in contour to the shape of the lagging or heat insulating provisions made for preventing an undesired transfer of heat between the units A and the surrounding atmosphere. These flanges may serve also as a means for securing a plurality of units A together to form a complete device or section including such a plurality of units. As shown in Figs. 1, 2 and 3 and 10, a pair of units A are assembled together, each pair forming a complete device. As shown in Figs. 1, 2 and 3, the flanges B have parallel meeting edges and are clamped together by bolts $B^{10}$. As shown in these figures also the flanges $B^9$ of the assembled units are surrounded by a sheet metal casing K. The space K' within the casing K and surrounding the unit casings I may be filled with air or some solid heat insulating material and thus serves to improve the efficiency of the apparatus.

Any suitable provisions may be made for passing the air to be cooled into the central passage $B^5$ of the lower end member B' of each unit and for conveying it away from the passage $B^5$ of the upper end chamber B. Usually I prefer to mount the assembled units on a hollow base member and to cover them by a hollow cap member with pipe connections for supplying air to the base member and conveying it away from the cap member. Such an arrangement is shown in Fig. 10 where P represents a pump having a bifurcated outlet pipe P' with one branch running to the bottom member of one and the other branch running to the bottom member of the other of two cooling devices each of which may comprise a two unit body portion like the construction shown in Figs. 1, 2 and 3.

In Fig. 10 L represents the hollow cap members to each of which is connected one branch of the bifurcated cooled air delivery pipes $P^2$, and in Figs. 1, 2 and 3, $B^{11}$ represents bolt holes in the flanges $B^9$ by which the units may be secured to the cap and base members. I have not thought it necessary to illustrate the construction of the top and bottom members of the two unit cooling devices, however, especially as those parts may be exactly similar to the corresponding parts of the five unit device shown in Figs. 4 and 5.

It will be apparent that with the unit construction illustrated in Figs. 1, 2 and 3, the units shown may be assembled in any convenient number to form a complete device of the desired capacity. For instance, Figs. 4 and 5 illustrate an arrangement in which five units are employed, the two end units A being exactly identical with those shown in Figs. 1, 2 and 3 while the intermediate units A' are practically identical, the only difference being that the end flanges of the units A' are rectangular instead of being curved at one side as are the otherwise similar flanges $B^9$ of the units A.

Figure 4:
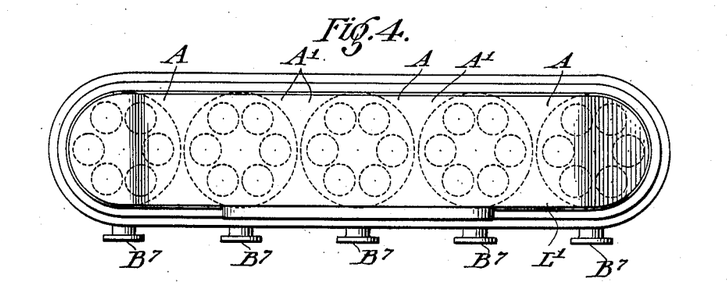
Fig. 4 is a plan, and Fig. 5 a sectional elevation, of a complete apparatus embodying features of construction and arrangement shown in Figs. 1, 2 and 3.
Figure 5:
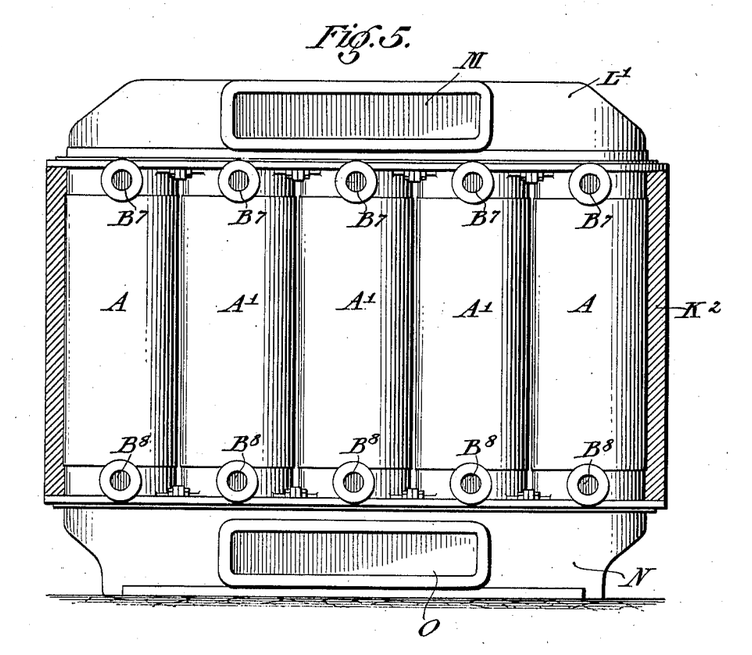

With the apparatus shown in Figs. 4 and 5 the units A and A' rest upon a hollow base member N provided with a lateral port O for the admission of the air to be cooled and are surmounted by a cap member L' generally similar to the member N and provided with a port M.

Figure 6:
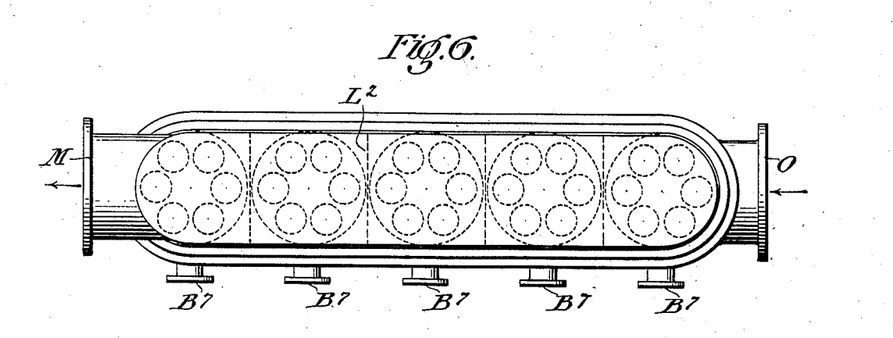
Fig. 6 is a plan, and Fig. 7, a sectional elevation, illustrating a slightly different form of apparatus from that shown in Figs. 4 and 5.
Figure 7:
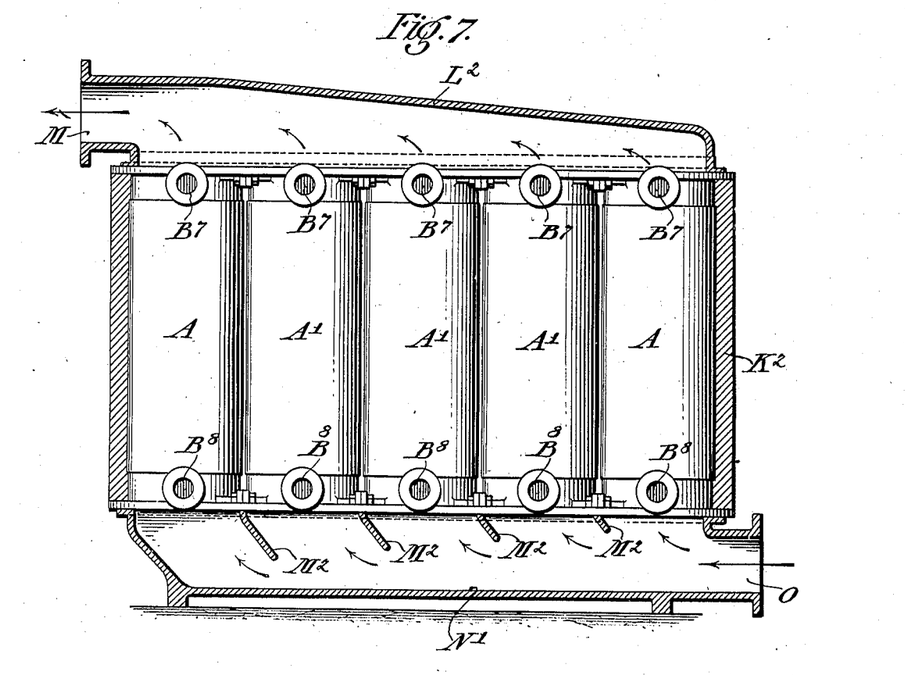

The arrangement shown in Figs. 6 and 7 differs from that shown in Figs. 4 and 5 in that the ports M and O, instead of being formed in the sides of the members $L^2$ and N', corresponding to the members L' and N of Figs. 4 and 5, are formed in the ends of those members. In this form provisions are made for obtaining a uniform division between the various units of the fluid entering the apparatus through the port O and leaving it through the port M after passing through the annular channels of the different units surrounding the various double tube elements. To accomplish this division the space in the upper cap member L' is made tapering in cross section, and baffles $N^2$ of progressively increasing depth are provided in the end member N'.

In the form shown in Figs. 4 and 5 the separate outside shell K of Figs. 1, 2 and 3, and the space between it and the units proper are dispensed with, and the units are inclosed in a solid shell or lagging of heat insulating material $K^2$, and in this respect the construction shown in Figs. 6 and 7 is like that shown in Figs. 4 and 5.

Figure 8:
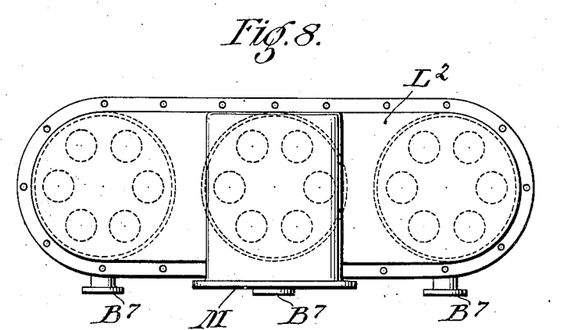
Fig. 8 is a plan, and Fig. 9, a sectional elevation, of another modification of the apparatus.
Figures 9, 9A, 9B:
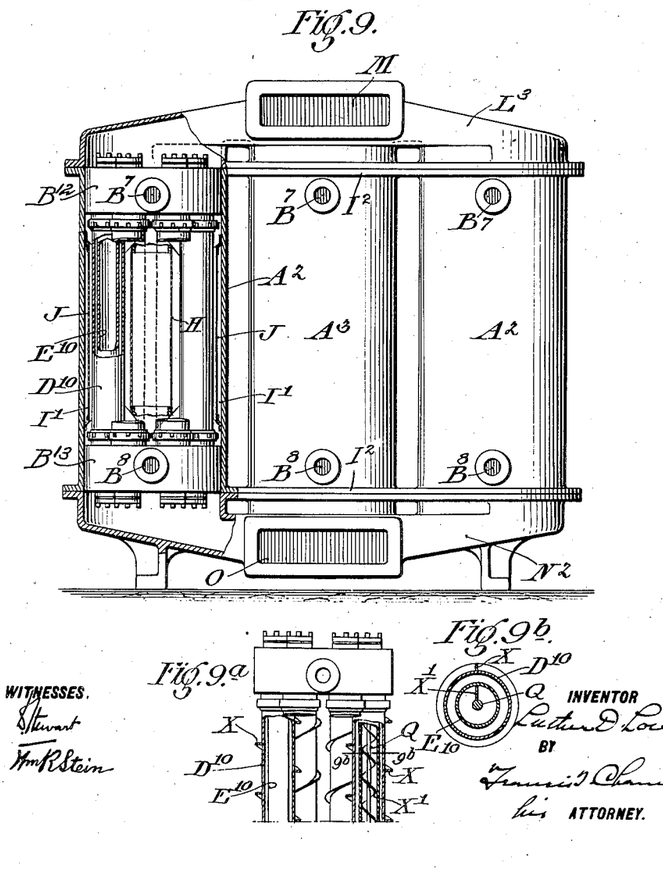

In the form shown in Figs. 8 and 9 the double tube elements are formed of uncorrugated tubes $D^{10}$ and $E^{10}$ respectively, which may be secured to the end members $B^{12}$ and $B^{13}$ corresponding to end members B and B' of the first construction, as the double tube elements and end members are connected together in the constructions previously described. In this form of the invention, also, the shells I' of the different units are connected at their ends by a common integral flange portion $I^2$. The end members $B^{12}$ and $B^{13}$ differ from the end members B and B' simply in the omission of the flanges $B^9$. The top and bottom members $L^3$ and $N^2$ may be essentially the same as members L' and N of Figs. 4 and 5.

Provisions may be made for elongating the flow path space surrounding each double tube element as by placing a spiral rib around the outer tube of each double tube element. Such an arrangement is shown in the modification of the straight tube structure shown in Figs. $9^a$ and $9^b$ where X represents the rib which may well be secured to one or the other of the tubes $D^{10}$ and $E^{10}$. In some cases it may be desirable to make the stream flowing through the interior of the inner tube of each double tube element more film like by centrally disposing a displacement member within each of such tubes, and in Figs. 9ª and 9ᵇ I have shown such a displacement agent in the form of a rod Q axially disposed within the tube E¹⁰. The space between this rod and the inner wall of the surrounding tube may be divided into a tortuous and elongated channel by a spiral rib X'.

With all forms of the apparatus disclosed it will be apparent that apparatus constituting any desired number of similar units can be built up as conditions may dictate without requiring any modifications of the units proper except that with the form of the end members of the units proper as shown in Figs. 1 to 7, inclusive, it is necessary that the end members of certain units shall have flanges B⁹ rounded at one side as shown in Figs. 1, 2 and 3, while others should have the corresponding flanges rectangular. In the form shown in Figs. 8 and 9, the units may be all alike, but to provide apparatus with different numbers of units it is only necessary to provide casing shells shaped for the proper number of units desired.

Figure 11:
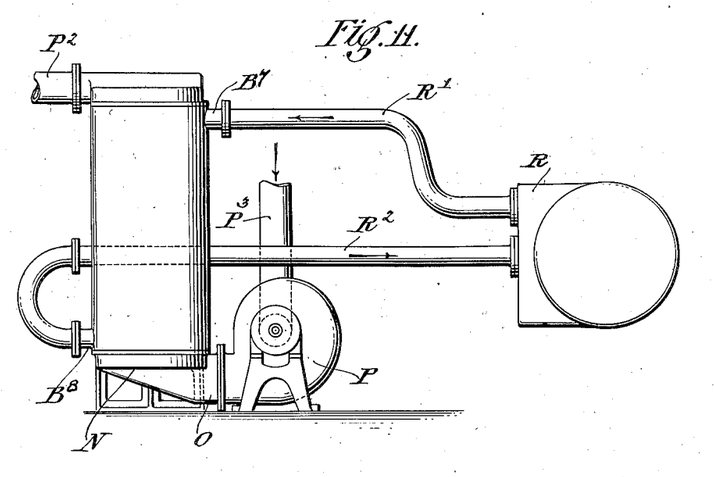
Fig. 11 is a somewhat diagrammatic representation illustrating the use of the invention.

Fig. 11 may be taken as illustrating the use of any of the forms of apparatus shown in Figs. 1 to 5, and 8 and 9, but, as shown in Fig. 11, the pipe connections B⁷ lead from the same side of the cooling device as does the port O, and the port M and pipe connections B⁸ open at the opposite side. In this arrangement R represents a refrigerating machine for supplying dense air which passes through the outlet pipe R' of the refrigerating machine to the pipe connection or connections B⁷. The pipe or connections B⁸ are connected to the inlet pipe R² of the refrigerator. The blower P which forces the air to be cooled through the apparatus has its outlet directly connected to the inlet O of the lower end member. P² carries the cool air to the place where it is to be delivered. For instance it may lead to the magazines of a battleship when it is desired to maintain the air therein at a lower temperature than the surrounding atmosphere, or to the interior of a theater or like building or compartment. The pipe P³ of the blower may in some cases draw air from the external atmosphere and in other cases may draw air from the room or compartment or chamber to which the pipe P² leads. In the latter case there is of course complete circulation and in some cases, a better efficiency than where the air is taken from the atmosphere. The most efficient of these places, so far as the cooling alone is concerned, from which to supply air to the blower will depend on whether the temperature in the chamber to which the cooled air is driven is hotter or colder than the surrounding atmosphere.

In addition to many obvious mechanical advantages, so to speak, with the apparatus disclosed, due to its simplicity of construction, compactness and inherent efficiency for obtaining a rapid exchange of heat between two fluids of different temperatures, I find that it is peculiarly useful in carrying out my new process of cooling air or like gaseous fluid containing moisture by the use of a cooling agent such as dense air at a temperature substantially below the freezing point. Under such conditions the moisture in the air being cooled is to a considerable extent condensed while the air is passing through the cooler. An appreciable portion of this moisture is deposited in a solid form on the exposed inner and outer walls of the double tube elements, and I have found by extended experiments that when the air to be cooled is passed into the bottom of the relatively thin channels of the cooler through which it is to pass, the efficiency is substantially higher than when the direction of flow of the air is reversed. This I believe to be due to the fact that with the direction of flow specified the deposit of the moisture is to a large extent in the form of frost which does not greatly interfere with the transfer of heat between the two fluids, but when the air to be cooled is admitted at the top of the vertical channels through which it flows a film or coating of ice is formed on the exposed tube walls which does materially interfere with the transfer of heat between the two fluids and thus reduces the effectiveness of the apparatus. The explanation of this difference in the way in which moisture is deposited on the exposed tube walls I believe to be as follows: With either direction of flow the first deposit of moisture is to a considerable extent, at least, in the form of frost, when thereafter the temperature conditions change as they are bound to do from time to time in practice some of the frost is melted adjacent the end of the apparatus at which the air to be cooled enters. The melted frost runs down the tube walls of course and runs into a hotter zone, so to speak, if the air to be cooled enters at the bottom in which case the water formed by the melting frost flows down off the tubes and either flows out of the apparatus or collects in the lower chambers thereof. Where the air to be cooled enters at the top of the apparatus the water formed by the melted frost runs into a colder zone and congeals and this alternate melting and freezing continues until the tube walls are coated largely or entirely with ice. When the air to be cooled enters at the bottom of the apparatus the moisture condensed in the form of frost above the zone in which melting takes place, I believe to be blown out of the apparatus from time to time in more or less large amounts by the stream of air being cooled.

Having now described my invention, what I claim as new and desire to secure by Letters Patent is—

1. A device of the character described, comprising in combination, an opposed pair of chambered members having openings in their adjacent sides and a plurality of units secured between said chambered members and each consisting of hollow annular end members, and a series of double tube elements extending between said end members, and a casing surrounding the elements and connected to the end members of each unit, the interiors of said casings being in communication with the interiors of said chambered members through the axial openings in said end members, and said openings in said chambered members and the inner tubes of said double tube elements being open at their ends to the interiors of said chambered members through said openings in the latter.

2. A device of the character described, comprising in combination, an opposed pair of chambered members having openings in their adjacent sides, and a plurality of units secured between said chambered members and each consisting of hollow annular end members, and a series of double tube elements the inner tubes of said elements being open at their ends to the interiors of said chambered members through said openings formed in the latter, and means providing a series of channels each receiving one of said double tube elements and open at its ends to the interiors of said chambered members through the axial passages in said annular end members and said openings in said chambered members.

3. A device of the character described, having chambered end members and double tube elements connecting said end members and formed each of a pair of tubes arranged one within the other with a film like space between the two, tubes in communication with the chambers in said end members, and a central fluted cylinder surrounded by said elements, and a second internally fluted cylindrical member surrounding said elements.

4. In a device of the character described, the combination with chambered end members formed each with a circular series of axially extending bosses on its inner end, said bosses being hollow and open each to the chamber in the corresponding end member, double tube elements, one extending between each alined pair of bosses on the two end members and formed of two tubes, one within and separated by a film like space from the other, said space being in communication at its ends with the chambers in the end members, a central displacement member formed with ribs projecting between the adjacent pairs of elements, and an external casing member formed with ribs also projecting into the spaces between adjacent elements.

LUTHER D. LOVEKIN.

Witnesses:
ARNOLD KATZ,
D. STEWART.